Patented Feb. 15, 1949

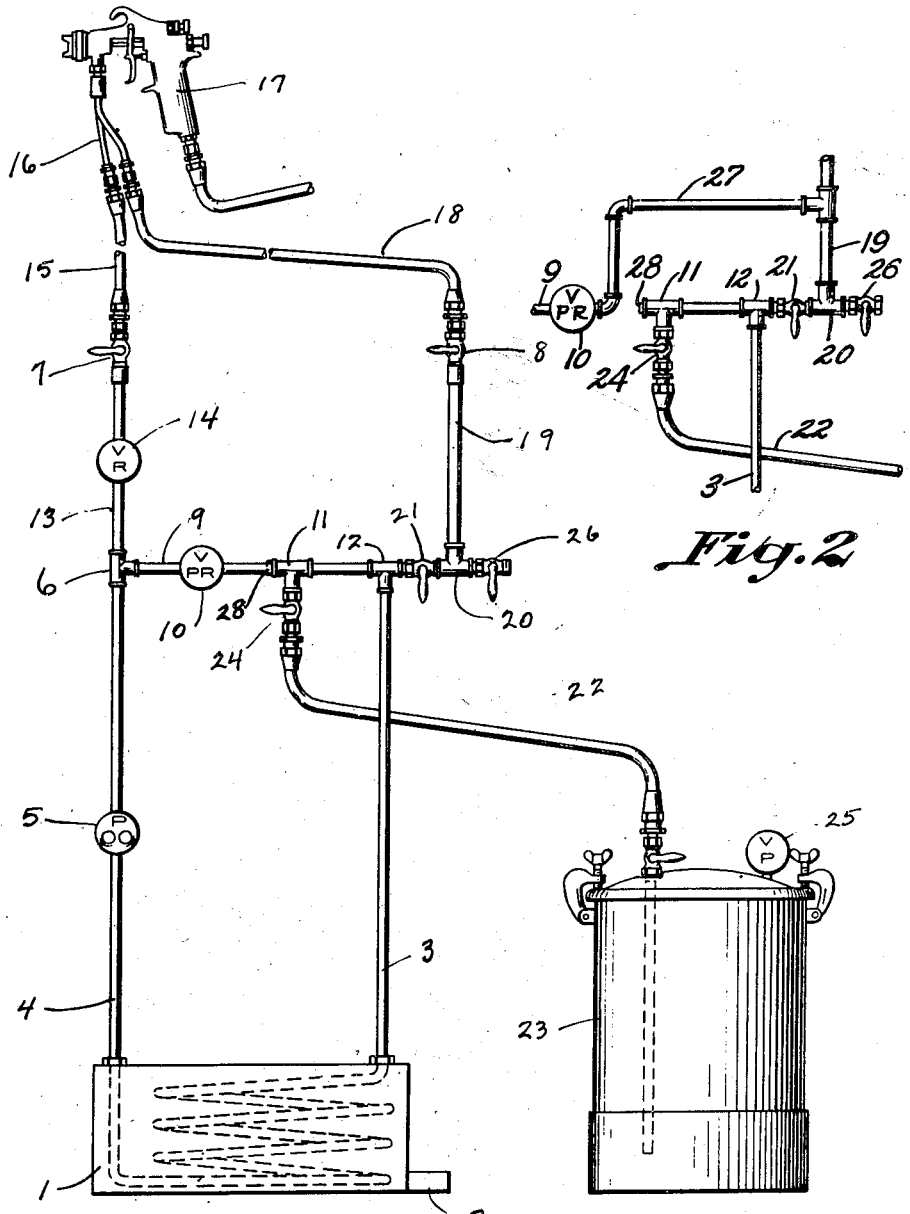

2,461,766

UNITED STATES PATENT OFFICE 2,461,766

APPARATUS FOR HEATING AND CIRCULATING SPRAY MATERIAL

Donald J. Peeps, Toledo, Ohio, assignor to The De Vilbiss Company, Toledo, Ohio, a corporation of Ohio.

Application June 6, 1945, Serial No. 597,808

2 Claims. (Cl. 222—146)

This invention relates to apparatus for maintaining a continuously moving supply of coating material available for use by a spray gun and delivering the supply to the spray gun at an unvarying elevated temperature; and relates particularly to such apparatus adapted for handling spray materials which are very viscous at normal temperatures but which are rendered more fluid when heated.

An important object of this invention is the provision of apparatus which will operate over long periods without the necessity of repairs or replacement.

A further object is the provision of apparatus which will efficiently deliver spray material in ample quantity to a spray gun with a minimum loss of heat.

Another object is the provision of equipment that is simple in design and easy to operate.

The principal means by which the objects of the invention are attained is the placing of the pump at a point in the apparatus where it receives material immediately following the passing of the material through the heating unit.

In apparatus of this type, considerable trouble has been encountered with the pump. It has been the custom to place the pump in the material line ahead of the heating unit; this has been considered the proper place for it even though the material passing through the pump is at its coldest temperature and hence most viscous. The pump is forced to work under an extremely heavy strain in order to deliver such material. Due to the burden of forcing through this glutinous coating material and the abrasive effects of the pigment ordinarily incorporated therein, pumps have usually failed after a comparatively short period of operation.

By heating the material just prior to the time it reaches the pump, as accomplished with this invention, the pump handles the material much more readily; is less affected by the pigment; delivers the material more smoothly and at a higher rate; and of most importance, is able to continue in operation, without the interruptions due to breakdowns, over a much longer working interval.

In my apparatus the circuit of the material does not include a heating reservoir or supply chamber through which the material movement would be slowed. By restricting the path of the material to piping, hose and other conduit means the amount of material required to fill the system is held to a minimum. It may accordingly, be rapidly and easily heated. The heat control is more exact and there is not the danger of overheating present when a container with corners holding substantially static material is heated. It is most important to avoid excess heating as it is apt to seriously impair the quality of the coating materials.

The objects and advantages of this invention will be better understood after a reading of the following description with reference being given the accompanying diagrammatic drawing in which an embodiment of the invention is illustrated in Fig. 1; and an alternate piping arrangement for a portion thereof is shown in Fig. 2.

The heater 1 is preferably one using steam for which an inlet 2 is provided. The flow of steam is controlled by proper thermostatic devices set to maintain the temperature at point desired. Hot water and electricity are also suitable heating media. Coating material enters the heater through conduit 3 and, after passing through a copper coil surrounded by steam, leaves by conduit 4. The pump 5 is located in conduit 4. A rotary pump is generally best suited for the purpose. It may be driven by an electric motor although an air motor is more desirable as the speed may be adjusted by the use of a simple needle valve in the air supply line. By varying the speed of the air motor the fluid flow is regulated.

From the pump the material proceeds along the extension of conduit 4 to the T connection 6. When the apparatus is first put into operation it takes a few minutes before the material reaches the proper heat. In order that the heat be applied more rapidly, and to reduce the amount of conduit through which the material must be forced, the valves 7 and 8 are closed. The material then turns through connection 6 into conduit 9 past relief valve 10. This valve is spring loaded and set to open automatically at 80 pounds or other predetermined pressure. The material next travels straight through replenishing inlet T connection 11, continues through the further section of conduit 9 and turns downward through T connection 12 back into conduit 3 and heater 1.

The alternate piping arrangement, which is preferable in some respects, and which is presented in Fig. 2, is designated generally by the numeral 27. With the use of this form the T connection 11 is disconnected from conduit 9 and closed by a plug 28. The material after passing through relief valve 10 turns into piping 27 and flows therefrom into conduit 19. From conduit 19 it travels through T connection 20, valve 21 and turns downward through T connection 12 back into conduit 3.

The preliminary heating derived from circulating the material through the heater and back through the by-passing conduit 9 puts the material in suitable fluid condition to flow easily through the conduits to and from the spray gun after the valves 7 and 8 are opened preparatory to the actual spraying operation.

With the valves 7 and 8 open the material reaching T connection 6 travels onward through conduit 13, pressure regulating valve 14, and material supply hose 15 to the spray gun connection 16. The material not proceeding into the spray gun 17 passes down the other leg of connection 16 into return hose 18 from which the material enters conduit 19. This conduit terminates in T connection 20. Normally valve 21 is open and the material flows therethrough and continues its circulation through conduit 3 and heater 4.

To replace the material removed from the circulating system by the spray gun a replenishing supply is delivered through hose 22 from standard pressure feed tank 23. The new material passes through conduit 22, valve 24 and T connection 11 and joins the material in motion through the circuit at T connection 12. This new material is cold. In this apparatus it travels only a short distance before mixing with previously heated material with which is passes through the heating zone. Air pressure, regulated by valve 25, is applied to the cold material within the pressure feed tank. It provides the propelling force delivering the material to the circulating system. The expanding quality of the air pressure by which this material is fed, reduces pressure pulsations in the circulating line caused by intermittent use of the spray gun.

In the type of systems where the connection for the replenishing supply of material is located on the discharge side of the pump, the material supply pressure is not so effective in compensating for the fluctuations in pressure caused by the spray gun operation. For this reason there exists with these conventional apparatus a variation in pressure that frequently has objectionable effects on the distribution of the sprayed coatings.

Outlet valve 26 attached to connection 20 is closed during the regular operation of the system. However, when it is desired to discontinue spraying and remove the material from the apparatus, valve 21 is closed, and valve 26 is opened.

An open container is placed below valve 26 or in position to receive material from a hose connected to the valve. The pump 5 is restarted and in case it is desired to empty the material from the pressure feed tank 23 the connection from the tank through hose 22, valve 24 and T connection 11 is left open. In any case, valve 24 is set in open position because air must be allowed entry into the system to prevent the creation of a vacuum as the material is withdrawn. A vacuum would retard if not prevent the removal of all the material.

While I have described my invention in its preferred form, I desire it to be understood that modifications may be made, particularly in regard to the arrangement of valves and piping, without departing from the spirit of the invention or the scope of the appended claims.

I claim:

1. In an apparatus for maintaining a continuous flow of heated material available for application by a spray gun, a conduit circuit through which the material passes, a pump in the circuit for forcing material therethrough, a spray gun connection in the circuit from which material reaches the spray gun, a pressure reducing valve in the circuit between the discharge side of the pump and the spray gun connection, a by-pass conduit from the circuit at a point between the pump and the pressure reducing valve across to a point in the circuit between the spray gun connection and the inlet side of the pump, a pressure relief valve in the by-pass conduit to prevent any flow therethrough under a certain pre-determined pressure, a material replenishing inlet communicating with the circuit on the outlet side of the pressure relief valve and valve means in the circuit between the spray gun connection and the material replenishing inlet for directing the material through a draining outlet in order to remove material from the circuit.

2. In an apparatus for maintaining a continuous flow of heated material available for application by a spray gun, a conduit circuit through which the material passes, a pump in the circuit for forcing material therethrough, a spray gun connection in the circuit from which material reaches the spray gun, a pressure reducing valve in the circuit between the discharge side of the pump and the spray gun connection, heating means associated with the circuit on the inlet side of the pump, a material replenishing inlet in the portion of the circuit in which the material flows from the spray gun connection to the heating means, a material supply container outside of said circuit connected to the circuit through said inlet, a by-pass conduit from the circuit at a point between the pump and the pressure reducing valve across to a point in the circuit between the spray gun connection and the heater, and a pressure relief valve in the by-pass conduit to prevent any flow therethrough under a pre-determined pressure.

DONALD J. PEEPS.

REFERENCES CITED

The following references are of record in the file of this patent:

UNITED STATES PATENTS

| Number | Name | Date |
| --- | --- | --- |
| 1,983,140 | McCathron | Dec. 4, 1934 |
| 2,123,604 | Johnson | July 12, 1938 |
| 2,366,150 | Yount | Dec. 26, 1944 |
| 2,378,184 | Carlson | June 12, 1945 |